United States Patent
Kalech et al.

(10) Patent No.: US 9,934,131 B2
(45) Date of Patent: Apr. 3, 2018

(54) USING MODEL-BASED DIAGNOSIS TO IMPROVE SOFTWARE TESTING

(71) Applicant: B. G. NEGEV TECHNOLOGIES AND APPLICATIONS LTD., AT BEN-GURION UNIVERSITY, Beer Sheva (IL)

(72) Inventors: Meir Kalech, Modi'in (IL); Ron Stern, Modi'in (IL)

(73) Assignee: B. G. NEGEV TECHNOLOGIES AND APPLICATIONS LTD., AT BEN-GURION UNIVERSITY, Beer Sheva (IL)

(*) Notice: Subject to any disclaimer, the term of this patent is extended or adjusted under 35 U.S.C. 154(b) by 100 days.

(21) Appl. No.: 15/116,816

(22) PCT Filed: Feb. 5, 2015

(86) PCT No.: PCT/IL2015/050131
§ 371 (c)(1),
(2) Date: Aug. 4, 2016

(87) PCT Pub. No.: WO2015/118536
PCT Pub. Date: Aug. 13, 2015

(65) Prior Publication Data
US 2017/0153967 A1    Jun. 1, 2017

Related U.S. Application Data

(60) Provisional application No. 61/936,370, filed on Feb. 6, 2014.

(51) Int. Cl.
*G06F 9/44*     (2006.01)
*G06F 11/36*    (2006.01)
*G06N 7/00*     (2006.01)

(52) U.S. Cl.
CPC ......... *G06F 11/3672* (2013.01); *G06N 7/005* (2013.01)

(58) Field of Classification Search
CPC .......................... G06F 11/3672; G06N 7/005
(Continued)

(56) References Cited

U.S. PATENT DOCUMENTS

2003/0051232 A1* 3/2003 Lam ................. G06F 11/362
                                                 717/131
2008/0010542 A1* 1/2008 Yamamoto .......... G06F 11/3672
                                                 714/38.1
(Continued)

OTHER PUBLICATIONS

Janssem, T. et al., Zoltar: A Toolset for Automatic Fault Localization, 2009 IEEE/ACM International Conference on Automated Software Engineering, pp. 662-664.
(Continued)

*Primary Examiner* — Anna Deng
(74) *Attorney, Agent, or Firm* — FisherBroyles, LLP; Robert Kinberg

(57) ABSTRACT

An artificial intelligence based method for improving a software testing process, according to which upon finding a bug, a set of candidate diagnoses is proposed to the tester, based on a Model-Based Diagnosis (MBD) process. A planning process is used for automatically suggesting further test steps to be performed by the tester, to identify the correct diagnosis for the developer in the form of faulty software component that caused the bug, while minimizing the tests steps performed by the tester. Additional information is provided to the MBD process, based on the outputs of the further test steps, thereby pruning incorrect candidate diagnoses. These steps are iteratively repeated while in each time, minimizing the set of candidate diagnoses, until a single diagnosis remains in the set.

10 Claims, 6 Drawing Sheets

---

Algorithm 1: An Algorithmic View of TDP

Input: $Tests$, the tests performed by the tester until the bug was found.

1  $\Omega \leftarrow$ Compute diagnosis from $Tests$
2  while Highest $\Omega$ contains more than a single diagnosis (or timeout has been reached) do
3  $\quad$ $NewTestPlan \leftarrow$ plan a new test to check at least one candidate diagnosis
4  $\quad$ Tester performs $NewTestPlan$, record output and trace in $NewTest$
5  $\quad$ $Tests \leftarrow Tests \cup NewTest$
6  $\quad$ $\Omega \leftarrow$ Compute diagnosis from $Tests$
7  end
8  return $\Omega$

(58) Field of Classification Search
USPC .......................................................... 717/124
See application file for complete search history.

(56) References Cited

U.S. PATENT DOCUMENTS

2008/0250273 A1* 10/2008 Yilmaz ............... G06F 11/3636
714/38.14
2013/0055195 A1* 2/2013 Weigert .................... G06F 8/10
717/104

OTHER PUBLICATIONS

Abreu, R. et al., Simultaneous Debugging of Software Faults, Journal of Systems and Software, vol. 84, Issue 4, Apr. 2011, pp. 573-586.
International Search Report for PCT/IL2015/050131, dated Jun. 7, 2015.
Written Opinion for PCT/IL2015/050131, dated Jun. 7, 2015.

* cited by examiner

Algorithm 1: An Algorithmic View of TDP

Input: *Tests*, the tests performed by the tester until the bug was found.

1    $\Omega \leftarrow$ Compute diagnosis from *Tests*
2    while *Highest $\Omega$ contains more than a single diagnosis (or timeout has been reached)* do
3        $NewTestPlan \leftarrow$ plan a new test to check at least one candidate diagnosis
4        Tester performs $NewTestPlan$, record output and trace in $NewTest$
5        $Tests \leftarrow Tests \cup NewTest$
6        $\Omega \leftarrow$ Compute diagnosis from *Tests*
7    end
8    return $\Omega$

Fig. 4

USING MODEL-BASED DIAGNOSIS TO IMPROVE SOFTWARE TESTING

FIELD OF THE INVENTION

The present invention relates to the field of software testing. More particularly, the invention relates to a method for improving software testing using model-based diagnosis.

BACKGROUND OF THE INVENTION

Testing is a fundamental part of the software development process. Generally, software testing phase involves finding bugs and fixing them. From the perspective of the programmer, fixing bugs usually involves two tasks. First, the root cause of the bug should be found (diagnosis), and then the faulty software component should be fixed. Diagnosing the root cause of a software bug is often a challenging task that involves a trial-and-error process: several possible diagnoses are suggested by the programmer, which then performed tests and probes to differentiate the correct diagnosis. One of the reasons why this trial-and-error process is challenging is because it is often non-trivial to reproduce bugs found by a tester.

An ideal solution to this problem would be that the tester, when observing a bug, will perform additional test steps to help the programmer find the software component that caused the bug. However, planning these additional test steps cannot be done efficiently without being familiar with the code of the tested software. Often, testing is done by Quality Assurance (QA) professionals, which are not familiar with the software code that they are testing. This separation, between those who write the code and those who test it, is even regarded as a best-practice, allowing unbiased testing.

In this work we propose to enhance the software testing process described above by combining model-based diagnosis (MBD) and planning techniques from the Artificial Intelligence (AI) literature. MBD algorithms have been proposed in the past for the purpose of diagnosing software bugs. Thus, when a tester encounters a bug, any of these algorithms can be used to generate a set of candidate diagnoses automatically.

However, the problem of identifying which of these candidate diagnoses is indeed the correct diagnoses still remains.

It is therefore an object of the present invention to provide a method for improving software testing using model-based diagnosis, which helps identifying which of the candidate diagnoses is the diagnosis which can isolate potentially faulty software components.

It is another object of the present invention to provide a method for improving software testing, which helps planning additional tests for the tester, to differentiate between these candidate diagnoses and identify the correct diagnosis.

It is a further object of the present invention to provide a method for improving software testing, which help planning additional tests for the tester, to identify the correct diagnosis.

It is yet another object of the present invention to provide a method for improving software testing, in which the additional tests are generated automatically.

Other objects and advantages of the invention will become apparent as the description proceeds.

SUMMARY OF THE INVENTION

The present invention is directed to an artificial intelligence (AI) based method for improving a software testing process, comprising the following steps:

a) upon finding a bug, proposing a set of candidate diagnoses, based on a Model-Based Diagnosis (MBD) process;
b) using a planning process for automatically suggesting further test steps to be performed by a tester, to identify the correct diagnosis for the developer in the form of faulty software component (a class, a function, a line of code or a block) that caused the bug, while minimizing the tests steps performed by the tester;
c) providing additional information (the outcome of the test) to the MBD process, based on the outputs of the further test steps, thereby pruning incorrect candidate diagnoses; and
d) iteratively repeating the steps above while in each time, minimizing the set of candidate diagnoses, until a single diagnosis remains in the set.

Whenever more than a single diagnosis remains in the set during the last iteration, automatically suggesting, by the planning process, further tests to be performed by the tester.

The MBD algorithm may include ranking the set of candidate diagnoses according to an estimate of the probability that the candidate diagnoses are correct.

Further test steps may be planned by defining a call graph consisting of nodes being software components and mutually disjoint sets of edges, where an edge between points on the call graph represents a call from a conditional or regular call from a component to another component.

A given candidate diagnosis may be checked by a test suite being any executable path in the call graph that passes via a component being a part of the candidate diagnosis, the test suite having a corresponding cost of its path in the call graph.

The possible test suites may be given by the user or the tester and may be a partial set of all possible paths in the call graph.

Further test steps may be performed using a Highest Probability Focused Testing, by performing the following steps:

a) assigning a probability score to every diagnosis;
b) defining a Highest Probability (HP), which computes for every component the probability that to be faulty, by taking the sum over the probabilities of all the diagnoses that contain that component; and
c) calculating the lowest cost path that passes via the highest probability component.

Alternatively, further test steps may be performed using a Lowest Cost Focused Testing, by planning the lowest-cost path that passes via at least one of the components in the set of candidate diagnoses, whose probability is not one or zero.

Alternatively, further test steps may be performed using an Entropy-Based Focus Testing, by performing the following steps:

a) selecting the lowest-cost path to every component that exists in a candidate diagnosis and that does not have a probability one or zero;
b) computing the information gain of performing every such path by calculating the entropy of the test suite that follows that path.

Alternatively, further test steps may be performed using a Markov Decision Process (MDP)-Based Focused Testing, by performing the following steps:

a) Modeling the problem to be solved as an MDP;
b) selecting as possible actions only test suites having a shortest path to every component being part of a candidate diagnosis;
c) reducing the number of actions to be equal to the number of relevant components;

d) defining a terminal state, for which a candidate set contains a candidate diagnosis with a probability higher than a predetermined threshold.

Alternatively, further test steps may be performed using AI diagnosis and planning by performing the following steps:

a) allowing an AI engine to access data sources consisting of the source code of the tested software, to the logs of the software that are accumulated during the runtime of the software (e.g., server logs), and to the Source-Control Management (SCM) tool history;
b) upon detecting a bug in the tested software, initiating an interactive process by the AI engine, during which all the data sources are aggregated to propose candidate diagnoses and further tests to be executed by the tester;
c) allowing the tester to perform additional tests initiated by the AI engine;
d) reporting the observed outcome of the additional tests back to the AI engine;
e) reporting the AI engine when the bug is fixed, or upon finding that the bug actually caused by a different software component; and
f) allowing the AI engine to modify its diagnosis engine, according to the reported data.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 4 illustrates an algorithmic view of the Test, Diagnose and Plan (TDP), proposed by the present invention.

DETAILED DESCRIPTION OF PREFERRED EMBODIMENTS

The present invention proposes using a combination of AI techniques to improve the software testing process. When a bug is found, a model-based diagnosis (MBD) algorithm is used to propose a set of candidate diagnoses. Then, several planning techniques (that were evaluated on simulated software model graphs, as well as on the NUnit open source project) are used to suggest further test steps to identify the correct diagnosis, while minimizing the tests steps performed by the tester. The tester preforms these tests, provide additional information to an MBD algorithm for pruning incorrect candidate diagnoses. This iterative process continues, until the correct diagnosis is returned. Several planning techniques are proposed to minimize the actions the tester performs in this process until the correct diagnosis is returned.

To identify which of these candidate diagnoses is indeed the correct diagnoses, several algorithms are used for planning additional test steps for the tester. These tests are generated automatically, by considering the set of candidate diagnoses and proposing tests that will differentiate between these candidate diagnoses. This process of testing, diagnosing and planning further testing is repeated, until a single diagnosis is found. Several algorithms may be used for planning these additional test steps. Contrary to prior art methods for tests generation for software, the solution proposed by the present invention does not assume any model of the diagnosed software or an ability to manipulate internal variables of the software. The proposed method is a kind of algorithmic debugging that combines software MBD with planning.

Traditional Software Testing

Figure 1A:
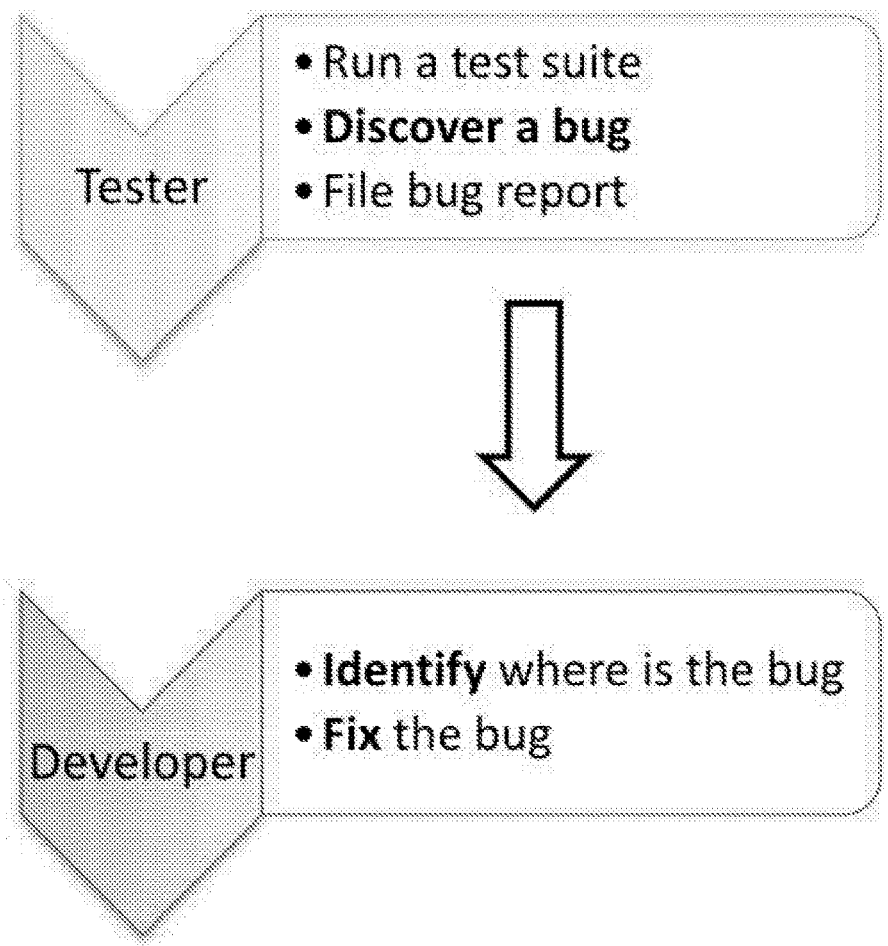
FIG. 1a (prior art) illustrates a process of traditional software testing.

The purpose of the traditional software testing process is to verify that the developed system functions properly. The term "tester" is defined as a person who tests the software. The term "developer" refers to the person who programs the software. Testing may be considered as part of an information passing process between the tester and the developer. This process is depicted in FIG. 1a (prior art). The tester executes a predefined sequence of steps to test some functionality of the developed system. Such a sequence of steps is called a test suite. The tester runs all the steps in the test suite until either the test suite is done and all the tests have passed, or one of the tests fails, in which case a bug has been found. The tester then files a bug report in some bug tracking systems (e.g., HP Quality Center, Bugzilla or IBM Rational ClearQuest), and continues to test other components (if possible). The reported bugs are Periodically passed to the developer, possibly prioritized by the product owner. In order to fix the bug, the developer needs to identify the faulty software component and fix it.

The Proposed Test, Diagnose and Plan (TDP) Process

The present invention proposes a new testing process, called Test, Diagnose and Plan (TDP), for improving the traditional process described above by providing Artificial Intelligence (AI) tools to the tester and incorporating model-based diagnosis and planning methods from the AI field to improve the effectiveness of traditional software testing. According to the proposed TDP process, the tester, will be able to identify for the developer the faulty software component that caused the bug.

The TDP process consists of two components: an MBD algorithm and a planning algorithm. The MBD algorithm suggests a set of candidate diagnoses and the planning algorithm plans further tests to provide information for identifying the correct diagnosis.

In the proposed TDP, when a bug is found a MBD algorithm is run to suggest a set of candidate diagnoses. If this set contains a single diagnosis, it is passed to the developer. Otherwise, a planning algorithm suggests further tests for the tester, to minimize the set of candidate diagnoses. The tester performs these tests and report the observed output back to the MBD algorithm, which then outputs a new set of candidate diagnoses. This process is repeated until a single diagnosis is found and passed to the developer. Of course, other conditions for terminating the iterations are also possible.

Figure 1B:
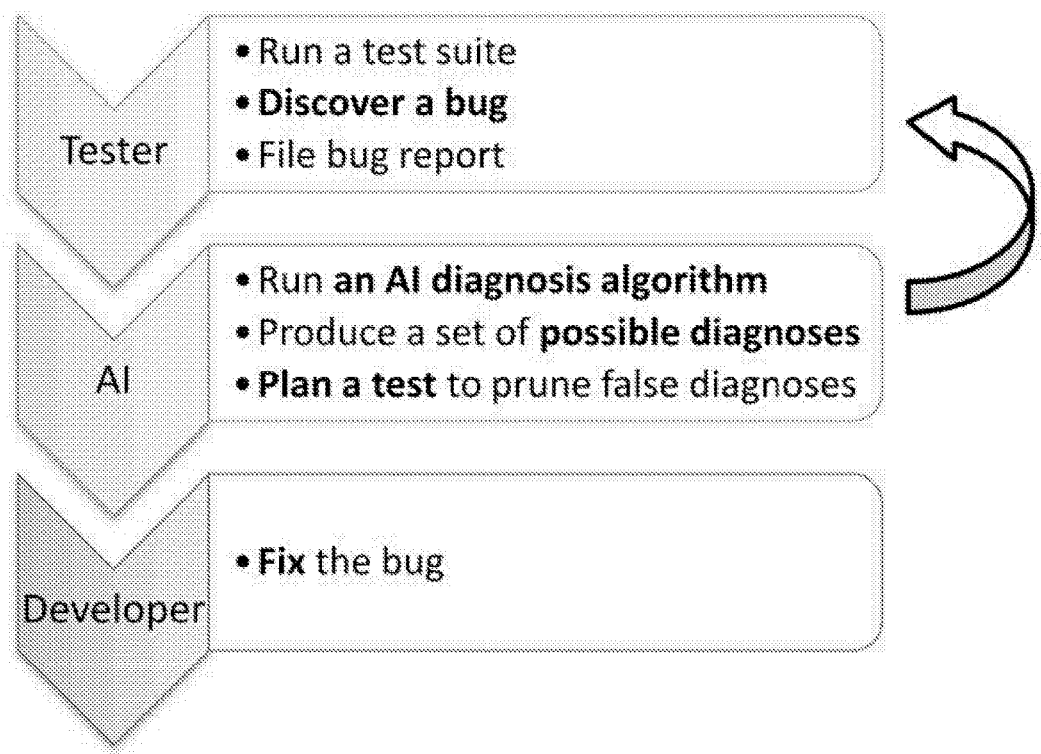
FIG. 1b illustrates the process of Test, Diagnose and Plan (TDP), proposed by the present invention.

FIG. 1b illustrates the process of Test, Diagnose and Plan (TDP), proposed by the present invention. According to the proposed TDP process, the exact software components that caused the bug are forwarded to the developer. If the tester performs additional tests immediately when the bug is observed, as is done in TDP, he is expected to provide information which may be difficult to obtain when the bug is reproduced by the developer. This is because important details may be missing from bug reports and the tested software my have stochastic elements.

The components that runs the proposed TDP process are the MBD and the planning algorithms.

Model-Based Diagnosis (MBD) for Software

The most basic entity of an MBD algorithm is the component. In software, a component can be defined for any level of granularity: a class, a function, a block etc. Naturally, low level granularity will result in a very focused diagnosis (e.g., pointing on the exact line of code that was faulty), but obtaining this kind of diagnosis will require more resources.

The task of an MBD engine is to produce a diagnosis, which is a set of components that are believed to be faulty. In some cases, MBD algorithms return a set of candidate diagnoses, where each of these candidates can potentially be a diagnosis, according to the observed tests.

Two main approaches have been already proposed in existing MBD algorithms, for diagnosing software. The first approach considers a system description that models the correct functionality of software components in logical terms. If an observed output deviates from the expected output as defined by the system description, then logical reasoning techniques are used to infer candidate diagnoses that explain the unexpected output. The main drawback of this approach is that it does not scale well. Additionally, modeling the behavior of a software component is often infeasible. An alternative approach to software diagnosis that is based on spectrum-based fault localization (SFL) has been proposed. In this approach, there is no need to model the correct functionality of each of the software components in the system. All that is needed is the following information from every observed test:

The outcome of the test, i.e., whether the test has passed or a bug was found. This is observed by the tester.
   The trace of a test. This is the sequence of components (e.g., functions, classes) that used during this observed test. Such a trace can be obtained using common software profilers (e.g., Java's JVMTI), or from an applicative system log, if implemented.

If a test failed, this means that at least one of the components in its trace is faulty. This corresponds to a conflict from the classical MBD. A conflict is a set of components, such that the assumption that they are healthy is not consistent with the observations. Conflict-directed MBD algorithms use conflicts to find diagnoses. Intuitively, since at least one component in every conflict is faulty, a hitting set of the conflicts will explain the unexpected observation.

A recently proposed software MBD algorithm named "Zoltar" (Zoltar: A Toolset for Automatic Fault Localization, Janssen et al., ASE '09 Proceedings of the 2009 IEEE/ACM International Conference on Automated Software Engineering, pp 662-664) which is an MBD algorithm that can scale to large systems without using any modeling of the diagnosed software and is based on this exact concept of considering hitting sets of components that are in traces with failed outcome. An important aspect of Zoltar is that it also provides a mathematical formula to rank the set of candidate diagnoses according to an estimate of the probability that they are correct. Exact probability computations are described in "Simultaneous debugging of software faults" (Abreu et al., Journal of Systems and Software 84(4): 573-586).

This spectrum-based approach to software diagnosis, and Zoltar algorithm in particular, can scale well to large systems. However, it is may output a large set of alternative candidate diagnoses.

According to the present invention, additional tests are automatically planned, so as to prune the set of candidate diagnosis, while seeking the correct diagnoses.

Planning in TDP

Since there are often many candidate diagnoses, but only one correct diagnosis, further tests should be performed. The present invention proposes a set of algorithms that plan a sequence of tests to narrow down the number of possible diagnoses. These tests will be generated by these algorithms on-the-fly when the tester reports a bug. The tester will then execute these focused testing, and as a result, the number of possible diagnoses will decrease, and the developer will be given a smaller set diagnoses (or even a single diagnosis) to consider, in order to minimize the tester efforts seeking a single diagnosis.

Figure 2A:
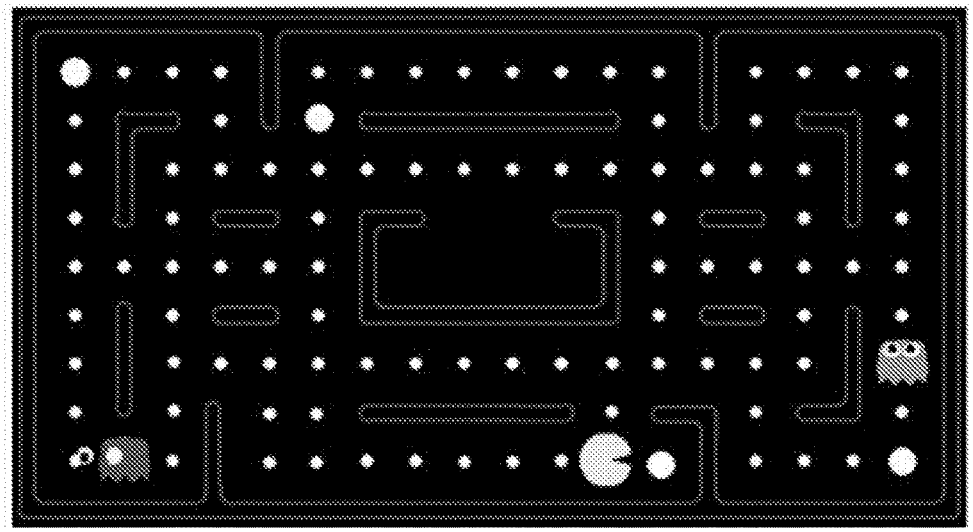
FIG. 2a is a Pac-Man example illustrating the initial Pac-Man position.
Figure 2B:
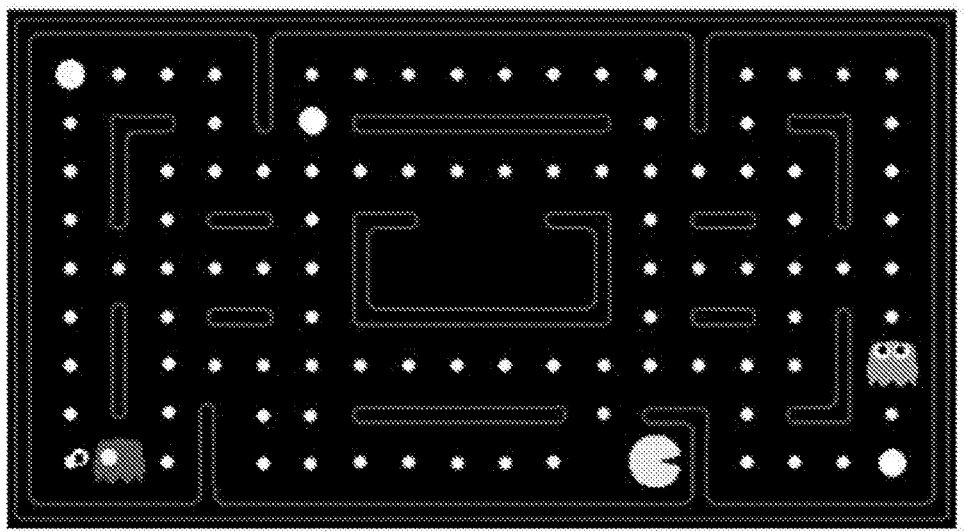
FIG. 2b is a Pac-Man example illustrating the Pac-Man position where the bug has been observed.

FIGS. 2a and 2b are examples of a tested program of the well-known Pac-Man computer game. Automated planning can be used to intelligently direct testing efforts. FIG. 2a shows the initial state of a variant of the Pac-Man game. Assuming that the test, performed by the tester, is where the Pac-Man moved one step to the right. The new location of Pac-Man has a power pellet (the large circle) and it is bordering a wall (FIG. 2b). Assuming that following this test, the game crashed, i.e., a bug occurred, and that the functions called when the game has crashed were: (1) Move right, (2) Eat power pellet, and (3) Stop before a wall, are denoted as F1, F2 and F3, respectively. A failure in each one of these functions can explain the observed bug. Thus the Zoltar MBD diagnosis algorithm would generate three candidate diagnoses: {{F1}, {F2}, {F3}}.

Further testing can be performed to deduce which of these three candidate diagnoses is correct. In order to check if F1 caused the bug, the tester can move pac-man two steps up and one step to the right. To check F2 pac-man should be moved to one of the other power pellets in the game. To check F3 Pac-Man should be moved to the left wall. These three possible tests are shown by arrows in FIG. 3. By performing these 3 additional tests, it is possible to deduce a single correct diagnosis.

FIG. 4 illustrates an algorithmic view of the Test, Diagnose and Plan (TDP), proposed by the present invention. At the first step, a set of candidate diagnoses is generated from the observed tests that were performed by the tester as described earlier, until the bug has occurred (line 1 in Procedure 1). At the next step, a test suite (i.e., a sequence of test actions for the tester) is generated, such that at least one of the candidate diagnoses is checked (line 3). At the next step, the tester performs this newly generated test (line 4). At the next step, the diagnosis algorithm is run again, now with the additional information observed when the new test that has been performed (line 5). If a single diagnosis is found, it is passed to the developer, to fix the faulty software component. Otherwise, this process continues by planning and executing a new test.

Automatically Planning New Tests

At the first step, a call graph is defined as follows:

A call graph is a directed AND/OR graph $G=(V, E_a, E_o)$, where V is a set of software components and $E_a$ and $E_o$ are a mutually disjoint sets of edges. An edge between $v_1$ and $v_2$ represents a call from component $v_1$ to component $v_2$. $E_o$ are 'OR' edges representing conditional calls $E_a$ are 'AND' edges representing regular calls.

There are many automatic tools that generate a call graph from a static view of the source code. A test suite that will check a given candidate diagnosis can be any executable path in the call graph that passes via a component that is part of that candidate diagnoses. As every step in the graph corresponds to an action of the tester, every test suite has a cost, which is the cost (e.g., the length) of its path in the graph.

Possible test suites may be given by the user or by the tester and may be a partial set of all possible paths in the call graph.

There can be many possible tests to check a given candidate diagnosis, and there may be many candidate diagnoses. At the next step, these additional test suites are planned, so as to minimize cost, which corresponds to the testing effort required to find the correct diagnosis.

Balancing Testing Effort and Information Gain

Figure 3:
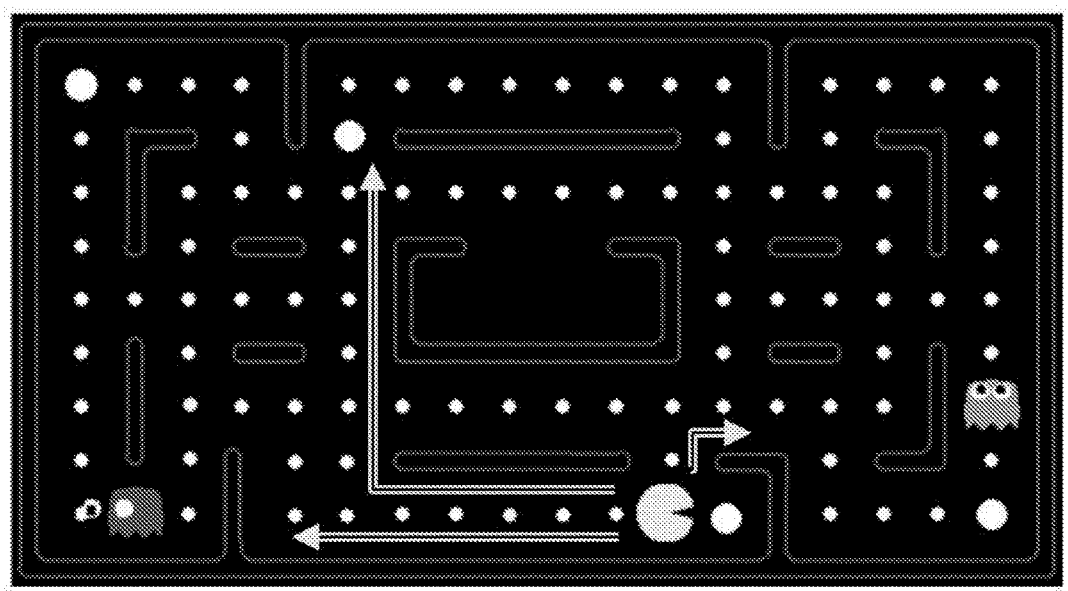
FIG. 3 is a Pac-Man example illustrating possible tests to be performed.

Returning back the Pac-Man example of FIGS. 2a and 2b, there are three proposed tests, marked by yellow arrows in FIG. 3. Intuitively, one might choose to perform the first proposed test (move up twice and then right), since it demands the least number of steps. For simplicity, it is assumed that the effort exerted by the tester when executing a test correlates with the number of steps in the test.

However, in some cases there are software components in which bugs occur more often. These components may be the more complex functions. For example, assuming that in the Pac-Man example describe above, eating the power pellet is the most complex function (F2), which is more likely to contain a bug than the "move right" function (F1). These "bug-probabilities" can be given as an input by the developer or the system architect or learned with data mining techniques.

There are several possible methods to plan and choose which test to perform. The term focused testing methods refers to these methods. The overall aim of a focused testing method is to propose test suites (one at a time) to minimize total testing cost required to find the correct diagnoses.

Highest Probability Focused Testing

The first type of focused testing method proposed by the present invention is based on the probabilities obtained by the diagnosis algorithm. The diagnosis algorithm assigns every diagnosis with a probability score that marks how probable that diagnosis is to be correct. Using these probabilities, a highest probability (HP) method is defined, which computes for every component the probability that it is faulty, by taking the sum over the probabilities of all the diagnoses that contain that component. HP then returns the lowest cost path that passes via the highest probability component. This probability-based approach is motivated by the assumption that checking first the high probability components will result in finding the correct diagnosis faster.

Lowest Cost Focused Testing

Another focused testing method proposed by the present invention is the Lowest Cost (LC) focused testing, which plans the lowest-cost path that passes via at least one of the components in the set of candidate diagnoses, whose probability is not one or zero. The last condition of LC is important. If a component has a probability one for being faulty, there is no point in checking it, as every such test will fail. Alternatively, if a component has a probability of zero of being faulty, running a test through it will not reveal more knowledge about other faulty components.

Entropy-Based Focus Testing

All the previous focused testing methods choose a single component and then plan the shortest path to it, while ignoring the components that are passed in the planned test, except for the single chosen components. In one embodiment, the present invention proposes a high-entropy method, according to which the lowest-cost path to every component that exists in a candidate diagnosis (and does not have a probability one or zero) is considered. Then the information gain of performing every such path is computed, by calculating the entropy of the test suite that follows that path.

Calculating the entropy of a test suite T is done as follows. Let $\Omega_+$ and $\Omega_-$ be the set of candidate diagnoses according to which T will pass and fail, respectively. Correspondingly, let $P(\Omega_+)$ and $P(\Omega_-)$ be the sum of the probabilities of each of the candidate diagnosis in $\Omega_+$ and $\Omega_-$, respectively. Since a test T may either pass or fail, clearly the sum of $P(\Omega_+)$ and $P(\Omega_-)$ is one. Then, the entropy of T is calculated as $P(\Omega_+)\log(P(\Omega_+))+P(\Omega_-)\log(P(\Omega_-))$.

The entropy method considers only the lowest-cost paths. It is theoretically possible to compute every possible path in the graph, measure its information gain and choose the path with the highest gain. However, the number of possible path in a graph is exponential, and thus the alternative entropy-based approach described above was used.

MDP-Based Focused Testing

All the previous methods, including the entropy-based method, are myopic in the sense that they plan a test to check a single component at a time. Thus, they do not perform any long-term planning of the testing process. More generally, we propose to view the problem as a problem of planning under uncertainty. Planning under uncertainty is a fundamental challenge in Artificial Intelligence, which is often addressed by modeling the problem as a Markov Decision Process (MDP—a framework for modeling decision making in situations where outcomes are partly random and partly under the control of a decision maker). Once a problem is modeled as an MDP, it can be solved by applying one of wide range of algorithms such as Value Iteration, Policy Iteration and Real-Time Dynamic Programming.

Modeling the Problem to be Solved as an MDP

A state is the set of tests executed so far and the observed outcome of these tests. The initial state is the set of tests performed so far by tester. The actions are the possible test suites that the tester can perform in a given state. The transition function should give the probability that a given test suite will fail or pass. This can be computed by the failure probabilities of the components in the test suite. As explained above, these probabilities are given by the diagnosis algorithms.

Before describing the reward function, it should be noted that since every state consists of a set of observed tests, it is possible to run the diagnosis algorithm on them, and obtain a set of candidate diagnoses, each of which with a probability assigned to it. The set of candidate diagnoses is called the candidate set of the state. A state with a candidate set that contains a single diagnosis is regarded as a terminal state, as there is no point in making additional actions from it. Thus, the MDP in this case can be viewed as a shortest path MDP, where the lowest-cost paths to a terminal state are sought. Hence, the reward of a test suite is set to be as the negative value of its cost.

An MDP algorithm seeks the policy that maximizes the expected reward that will be gained when executing that policy. Thus, in this case, an MDP algorithm will seek the policy that minimizes the number of test steps until the correct diagnosis is found. Theoretically, solving the above MDP will yield the optimal policy, and hence, will be the optimal focused testing method. However, the number of actions and states in this MDP is too large to solve optimally, since most MPD solvers are at least linear in the number of states in the MDP state space. It is easy to see that the number of states in the MDP is exponentially large (every possible set of tests and their outcome). Therefore the following relaxations are performed:

First, instead of considering all the possible test suites as possible actions, only a shortest path to every relevant (i.e., part of a candidate diagnosis) component is used as a possible action. This reduces the number of actions to be equal to the number of relevant components. Additionally, a probability threshold t is set to be used as follows: A state is regarded as a terminal state if its candidate set contains a candidate that has a probability higher than t. Thus, in the modified MDP there is no need to reach a state with a candidate set that contains a single candidate.

The last relaxation used for our MDP is to bound its horizon by a parameter h (this is basically a bounded lookahead). This means that a state that is h steps from the initial state is also regarded as a terminal state. The reward of such states was modified to reflect how far they are from reaching a state that has a candidate diagnosis that has a probability t, as follows:

For a state s, p(s) will be the probability of the candidate diagnosis in s that has the highest probability. Assuming that $s_{init}$ is the initial state and let s' be a state on the horizon (i.e., at depth h), if p(s')≥t, then its reward is zero (as no further testing are needed). Otherwise, the reward of s' is given by $$-(t - p(s')) \times \frac{h}{p(s') - p(s_{init})}$$

which simply assumes that reducing the p(s') value until it reaches t will continue in the same rate as it took to reduce $p(s_{init})$ to p(s'). For example, it may be assumed that $p(s_{init})$=0.2, p(s')=0.7 and h=5. This means that averagely, every increase of h (i.e., every additional test) reduced $p(s_{init})$ by $$\frac{0.7 - 0.2}{5} = 0.1.$$

Thus, it is possible to calculate the reward as $$-(t - p(s')) \times \frac{h}{p(s_{init}) - p(s')} = -(0.9 - 0.7) \times \frac{5}{0.7 - 0.2} = -2.$$

There are of course other options to calculate this reward.

There are many MPD solvers that can be used. In the experiments described below, h is set to be three. Also, to save runtime, a simple Monte-Carlo based MDP solver has been used. This solver samples the MDP state space to estimate the expected utility of every action.

Figure 5:
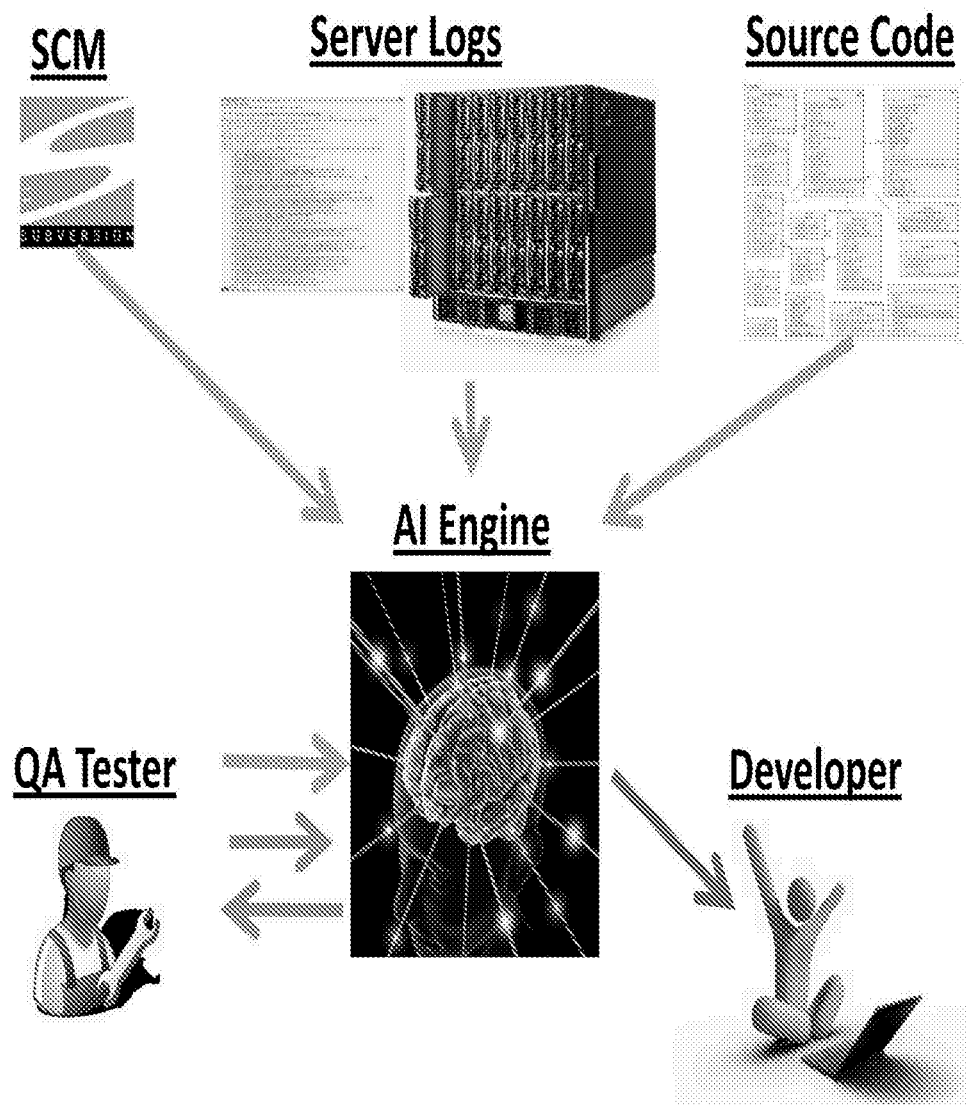
FIG. 5 illustrates incorporating AI diagnosis and planning into the testing process, as proposed by the present invention.

FIG. 5 illustrates incorporating AI diagnosis and planning into the testing process, as proposed by the present invention. The AI engine will be given access to the source code, the logs of the software that are accumulated during the runtime of the software (e.g., server logs), and the Source-Control Management (SCM) tool history. When a bug is detected, by either a human or an automated tester, the AI engine will initiate an integrative and interactive process, where all these data sources will be aggregated to propose candidate diagnoses and further tests to be executed by the tester. The tester will perform these additional tests suggested by the AI engine, and reports the observed outcome of these tests back to the AI engine. Eventually, the developer will be given the faulty software component, and will be tasked to fix it. The developer can then report back when the bug was fixed, or to notify the AI engine that the bug was actually caused by a different software component. The AI engine will learn from this feedback to modify its diagnosis engine to avoid such errors in the future.

The above examples and description have of course been provided only for the purpose of illustration, and are not intended to limit the invention in any way. As will be appreciated by the skilled person, the invention can be carried out in a great variety of ways, employing more than one technique from those described above, other than used in the description, all without exceeding the scope of the invention.

The invention claimed is:

1. An artificial intelligence based method for improving a software testing process, comprising:
   proposing, by a processor, a set of candidate diagnoses, upon finding a bug based on a Model-Based Diagnosis (MBD) process;
   using, by the processor, a planning process for automatically suggesting further test steps to be performed by a tester, to identify the correct diagnosis for the form of faulty software component that caused said bug, while minimizing the tests steps performed by said tester, wherein the planning process comprising defining a call graph consisting of nodes being software components and edges, where an edge between points on said call graph represents a call from a component to another component, and wherein a given candidate diagnosis is checked by a test suite being any executable path in the call graph that passes via a component being a part of said candidate diagnosis, said test suite having a corresponding cost of its path in said call graph;
   providing, by the processor, additional information to the MBD process, based on the outputs of said further test steps, thereby pruning incorrect candidate diagnoses, wherein the MBD includes algorithm for ranking the set of candidate diagnoses according to an estimate of a probability that said candidate diagnoses are correct; and
   iteratively repeating the steps above while in each time, minimizing the set of candidate diagnoses, until a single diagnosis remains in said set.

2. A method according to claim 1, wherein whenever more than a single diagnosis remains in the set during the last iteration, automatically suggesting, by the planning process, further tests to be performed by the tester.

3. A method according to claim 1, wherein the software component is a class, a function, a line of code or a block.

4. A method according to claim 1, wherein the additional information is the outcome of the test.

5. A method according to claim 1, wherein the possible test suites are given by the tester and are being a partial set of all possible paths in the call graph.

6. A method according to claim 1, wherein further test steps are performed using a Highest Probability Focused Testing, by performing the following steps:
   assigning a probability score to every diagnosis;
   defining a Highest Probability (HP), which computes for every component the probability that to be faulty, by taking the sum over the probabilities of all the diagnoses that contain that component; and
   calculating the lowest cost path that passes via the highest probability component.

7. A method according to claim 1, wherein further test steps are performed using a Lowest Cost Focused Testing, by planning the lowest-cost path that passes via at least one of the components in the set of candidate diagnoses, whose probability is not one or zero.

8. A method according to claim 1, wherein further test steps are performed by the processor using an Entropy-Based Focus Testing, by performing the following steps:
  selecting the lowest-cost path to every component that exists in a candidate diagnosis and that does not have a probability one or zero;
  computing the information gain of performing every such path by calculating the entropy of the test suite that follows that path.

9. A method according to claim 1, wherein further test steps are performed by the processor using a Markov Decision Process (MDP)-Based Focused Testing, by performing the following steps:
  Modeling the problem to be solved as an MDP;
  selecting as possible actions only test suites having a shortest path to every component being part of a candidate diagnosis;
  reducing the number of actions to be equal to the number of relevant components;
  defining a terminal state, for which a candidate set contains a candidate diagnosis with a probability higher than a predetermined threshold.

10. A method according to claim 1, wherein further test steps are performed by the processor using AI diagnosis and planning by performing the following steps:
  allowing an AI engine to access data sources consisting of the source code of the tested software, to the logs of the software that are accumulated during the runtime of said software (e.g., server logs), and to the Source-Control Management (SCM) tool history;
  upon detecting a bug in said tested software, initiating an interactive process by said AI engine, during which all said data sources are aggregated to propose candidate diagnoses and further tests to be executed by the tester;
  allowing said tester to perform additional tests initiated by said AI engine;
  reporting the observed outcome of said additional tests back to said AI engine;
  reporting said AI engine when said bug is fixed, or upon finding that said bug actually caused by a different software component;
  allowing said AI engine to modify its diagnosis engine, according to the reported data.

* * * * *